A. Crosby,
Steam-Engine Valve-Gear.

Nº 27,432. Patented Mar. 13, 1860.

Witnesses:

Inventor,
Addison Crosby

UNITED STATES PATENT OFFICE.

ADDISON CROSBY, OF FREDONIA, NEW YORK.

EDUCTION-VALVE GEAR OF STEAM-ENGINES.

Specification of Letters Patent No. 27,432, dated March 13, 1860.

*To all whom it may concern:*

Be it known that I, ADDISON CROSBY, of Fredonia, in the county of Chautauqua and State of New York, have invented a new and Improved Eduction-Valve Gear for Steam-Engines; and I do hereby declare that the following is a full, clear, and exact description of the same, reference being had to the accompanying drawings, forming part of this specification, in which—

Figure 1:
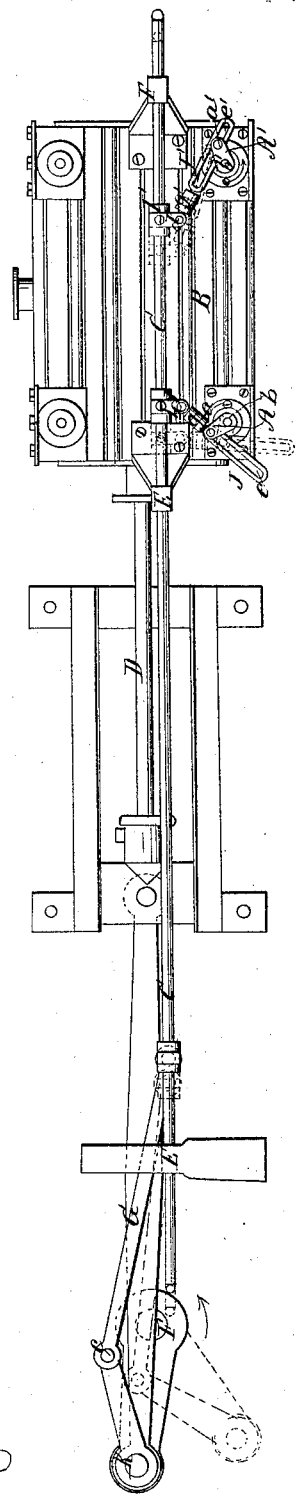
Figure 2:
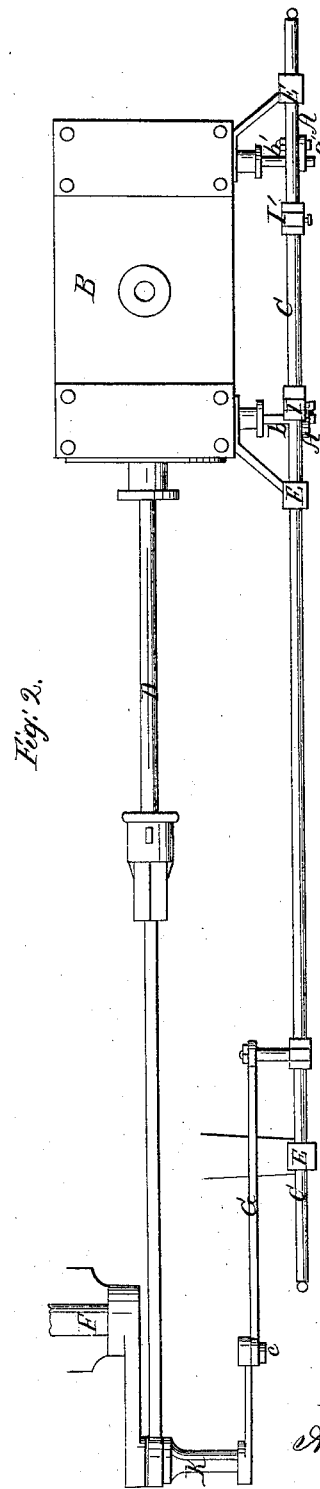

Figure 1, is a side view exhibiting the application of my invention to a horizontal engine. Fig. 2 is a plan view corresponding with Fig. 1.

Similar letters of reference indicate corresponding parts in the two figures.

My invention consists in the combination of a bar or rod deriving a regular reciprocating motion from the engine, with the stems of two oscillating eduction valves or with two rock shafts suitably applied in connection with valves of any other description, by means of arms on the stems or shafts, and slotted links attached to the rod to operate in combination with the said arms substantially as hereinafter specified, whereby the valves are made to open quickly at the commencement of the stroke of the engine and to remain wide open during nearly the whole stroke, but to close so gradually as to prevent slamming when valves of such construction as to be liable to slam are used.

To enable others skilled in the art to make and use my invention I will proceed to describe its construction and operation.

$b$ and $b'$, are the stems or shafts of two oscillating eduction valves fitted to ports in chests at opposite ends of the steam cylinder B. These stems or shafts are parallel with each other and have secured to them arms A, A', furnished with wrists $a$, $a'$, one arm and one wrist on each stem or shaft. The valves and their seats are so constructed that the former will be opened and closed with a small amount of movement, say about one twelfth of a revolution, of the stems or shafts in either direction.

C, is a rod arranged above the arms A, A', parallel with the piston rod D, of the engine and with a plane passing through the axes of the two valve stems or shafts ($b$, $b'$) in fixed guides E, E, in which it is fitted to slide longitudinally. This rod derives a reciprocating rectilinear motion from its connection by a rod G, with a wrist $c$, carried by the crank shaft F, of the engine, such wrist being so arranged relatively to the crank as to be about 45°, behind the main crank pin K, in its revolution. To this rod there are secured two collars I and I', to which there are connected, one to each, by pin joints $d$, $d'$, two slotted links J, J', whose slots $e$, $e'$, receive within them the wrists $a$, $a'$.

The two valves are arranged to open and close by movements in opposite directions, as will be understood by reference to Fig. 1. Where arrows are shown near the stems or shafts ($b$, $b'$) to indicate the direction in which they move to close the valves; and the arms A, A', are so arranged upon the stems that they have an inclination away from each other, each one having when closed an upward inclination from its shaft at an angle of about 20° to the rod C, as illustrated by the position of the arm A', represented in black in Fig. 1, and by the position of the arm A, represented in red in the same figure. The distance between the joints $d$, $d'$, of the two links J, J', is so much less than that between, the valve stems or shafts ($b$, $b'$) that each joint $d$, $d$, first arrives over its respective valve stem or shaft at the termination of its stroke.

The operation of this valve gear is as follows. As the piston arrives near either end of the cylinder, the wrist $a$, or $a'$, of the open valve at that end, is struck by the upper end of the slot in its respective link, J, or J', and moved in a direction to close the valve, and a little later, either before or at the termination of the stroke of the piston, the lower end of the slot of the other link J', or J, meets the wrist $a'$, or $a$, of the closed valve at the other end of the cylinder and moves it in a direction to open the said valve. The movement of both valves terminates with the stroke of the rod, one having been closed and the other having been opened wide; and both have been moved the same distance through the closing valve first commenced to move. The peculiar character of the movement will be understood by reference to Fig. 1, where black outlines represent the piston rod as having very nearly terminated its stroke, to the left and the rod C, as moving in the same direction and having just brought the upper end of the slot $e$, of the link J, into contact with the wrist $a$. The valve belonging to the wrist $a$ now begins to close and the other one to open, but the continued movement of the rod C, in the same direction causes the arm A, to move toward the position shown in red and its respective valve to close slowly, and with a diminishing velocity, till perfectly shut; and the same movement when that valve is nearly closed brings the lower end of the slot $e'$, of the link J', into contact with the wrist $a'$, and causes the valve belonging to that wrist to open quickly. The red outline represents the position of the parts at the termination of the stroke of the rod C. The reason why the closing valve is moved slowly and the opening one quickly, is that the link effecting the closing movement is approaching a position at right angles to the rod C, and hence a considerable movement of the rod is necessary to effect a slight longitudinal movement of the link, but the link effecting the opening movement is approaching a position parallel with the rod C, and its longitudinal movement is nearly equal to that of the said rod. In the return stroke of the rod the slots $e, e'$, pass along the wrists $a, a'$, without moving the valves till the stroke of the piston is again nearly completed when the operation of the links is on the wrists and valves precisely reversed the link J', acting upon the wrist $a'$, in the same manner as J, has been described as acting upon $a$, and the link J, acting upon $a$, in the same manner as J', has been described as acting upon $a'$.

This eduction valve gear may be applied in connection with slide, puppet, or other valves, without any change of the mechanism represented, by making suitable connections between such valves, and the rocking stems or shafts $b, b'$.

To provide for giving such a degree of lead to the eduction valves as may be desirable the links J, J', are made each in two pieces connected by right and left handed screw threads and double nuts $g, g'$, to lengthen and shorten them. The lead is increased by shortening the said links and diminished by lengthening them.

What I claim as my invention and desire to secure by Letters Patent, is:—

The combination of the reciprocating rod C, with the stems or shafts $b, b'$, of the valves, by means of arms A, A', and wrists $a, a'$, attached to the said stems or shafts and slotted links J, J', attached to the said rod, the whole arranged substantially as herein set forth.

ADDISON CROSBY.

Witnesses:
M. M. LIVINGSTON,
B. GIROUX.